United States Patent [19]

Telibasa

[11] Patent Number: 5,666,403
[45] Date of Patent: Sep. 9, 1997

[54] METHOD AND APPARATUS FOR SHARING A SINGLE TELEPHONE LINE BETWEEN A FACSIMILE MACHINE, DATA MODEM, TELEPHONE ANSWERING DEVICE, AND A PERSON

[75] Inventor: Marius Telibasa, Woodside, N.Y.

[73] Assignee: TT Systems Corporation, Yonkers, N.Y.

[21] Appl. No.: 317,932

[22] Filed: Oct. 3, 1994

[51] Int. Cl.⁶ .............................. H04M 1/64; H04M 11/00
[52] U.S. Cl. ................. 379/93.09; 379/67; 379/93.28; 379/100.15
[58] Field of Search ............................... 379/100, 98, 94, 379/93, 67, 88

[56] References Cited

U.S. PATENT DOCUMENTS

| | | | |
|---|---|---|---|
| 4,660,218 | 4/1987 | Hashimoto . | |
| 4,663,778 | 5/1987 | Takahashi . | |
| 4,788,714 | 11/1988 | Hashimoto . | |
| 4,800,439 | 1/1989 | Yoshino . | |
| 4,850,008 | 7/1989 | Berg et al. | 379/93 |
| 4,910,764 | 3/1990 | Bowen . | |
| 4,942,600 | 7/1990 | Suzuki . | |
| 5,062,133 | 10/1991 | Melrose | 379/94 |
| 5,146,489 | 9/1992 | Telibasa . | |
| 5,151,972 | 9/1992 | Lorenz et al. | 379/93 |
| 5,392,334 | 2/1995 | O'Mahony | 379/67 |

FOREIGN PATENT DOCUMENTS

| | | | |
|---|---|---|---|
| 4-238452 | 8/1992 | Japan | 379/100 |
| 6-62148 | 3/1994 | Japan | 379/100 |

OTHER PUBLICATIONS

Autoswitcher Description, Hello Direct catalog, Winter 1991, p. 31.

Pathfinder Description, Viking Electronics,Inc. Catalog, 1992, p. 10.

*Primary Examiner*—Thomas W. Brown
*Attorney, Agent, or Firm*—Darby & Darby, P.C.

[57] ABSTRACT

A device and a method for directing incoming calls from a single input telephone line to either a facsimile machine, a data modem, or a telephone is provided. The device and method provide for "isolating" both a facsimile machine and a data modem until after a predetermined delay period, thus preventing them to answer the call. If a person or answering machine has not answered the call within the delay period, an off-hook condition is simulated to the input telephone line, thus "answering" the call. The signal on the input telephone line is then detected. If the signal includes a DTMF digit, various functions are performed including resetting internal variables. If a facsimile handshake signal is detected, the facsimile machine is rung with a ring simulator. The facsimile machine can then read the incoming handshake signal and proceed in a conventional fashion. If, however, neither of these two signals are detected, and a telephone answering device has not answered the call, the data modem port is rung with the ring simulator. The data modem will then begin receiving the transmitted signal in a conventional fashion. If the call is answered during the delay period provided by the invention, and the transmission is a facsimile handshake signal, the call is automatically transferred to the waiting facsimile machine.

4 Claims, 8 Drawing Sheets

METHOD AND APPARATUS FOR SHARING A SINGLE TELEPHONE LINE BETWEEN A FACSIMILE MACHINE, DATA MODEM, TELEPHONE ANSWERING DEVICE, AND A PERSON

FIELD OF THE INVENTION

The present invention relates to a method and apparatus for directing incoming calls from a single telephone line to one of a facsimile machine, a data modem, or telephone.

BACKGROUND OF THE INVENTION

It is often desirable for individuals and small businesses who require only occasional use of a facsimile machine and data modem to share an existing single telephone line between these machines instead of dedicating separate telephone lines to them. In doing so, costs associated with installation and service charges are saved.

A problem with such a shared line arrangement is that an incoming call cannot be identified as either a voice, facsimile machine, or data modem call until the telephone is answered by a person, the facsimile machine, or data modem.

This inability to properly distinguish an incoming call prior to answering can lead to misplaced or unanswered incoming calls. For example, if a facsimile machine answers a voice call, the caller will become confused and possibly believe that a wrong number had been dialed and may hang up. Likewise, if a person answers a facsimile or data modem call, the transmitting device will most likely abort transmission because it did not receive any return "handshake" signals. Important data transmissions can be lost or delayed.

Facsimile machines are currently available with internal delaying circuitry which controls a delay period from the moment an incoming call is detected to when a facsimile machine answers the call. For example, the facsimile machine could answer an incoming call after a predetermined number of telephone rings. Upon answering any incoming call, a facsimile machine will immediately and continuously transmit return handshake signals along the single telephone line. If the incoming call happens to be a facsimile call from a remote facsimile station, the incoming handshake signals would be received by the local facsimile machine and the two machines would connect and begin data transmission.

If, however, the incoming call is a voice call, the facsimile machine would answer the call and begin transmitting return handshake signals for about 40 seconds. After not receiving the appropriate incoming handshake signals from the incoming voice call during this period, the facsimile machine would either disconnect the line or summon a person in the immediate area through the use of a beeper, indicating a voice call. This situation causes inconvenience to the caller because he must listen to the called facsimile station for about 40 seconds before any human is summoned to the telephone. Upon hearing the handshake signals, he will likely hang up.

Furthermore, this type of facsimile machine does not provide for the situation where the incoming call is a data modem call.

U.S. Pat. No. 5,146,489 to Telibasa discloses a device for use with a shared-line telephone/facsimile machine systems. The '489 patent does not provide for a system additionally sharing the telephone line with a data modem.

It is an object of the present invention to provide a method and apparatus which eliminate the need for a dedicated facsimile line and a dedicated data modem line.

It is another object of the invention to allow a person to answer an incoming call, fax, voice, or data modem, while not interfering with or disrupting the handshake procedure if it is a fax or data modem call.

Yet another object of the invention is to accommodate the connection of a separate message machine for allowing incoming callers who do not have automatic-transmission fax machines to call ahead by voice and prepare for fax transmission using on-line decoder detection.

It is another object of the invention to allow the setting of configuration variables for local devices remotely from a touch-tone telephone.

The present invention provides a device and a method for directing incoming calls from a single input telephone line to either a facsimile machine, a data modem, or a telephone. An incoming call is initially assumed to be a voice call, and ample time is provided for allowing a person to answer the phone. The device and method "isolate" both a facsimile machine and a data modem from the telephone until after a predetermined delay period following receipt of a call, thus preventing them from answering the call. The delay period may, for example, be three to seven rings, thus allowing ample time for an operator or answering machine to answer the call, while not causing any serious inconvenience to the caller.

If a person or answering machine has not answered the call within the delay period, an off-hook condition is simulated on the telephone line, thus "answering" the call. The signal on the telephone line is then detected. If the signal includes DTMF tones, various functions are performed including resetting internal variables. If a facsimile handshake signal is detected, the facsimile machine is rung with a ring simulator. The facsimile machine can then read the incoming handshake signal and proceed in a conventional fashion. If, however, neither of these two signals is detected, and a telephone answering device has not answered the call, the data modem port is rung with the ring simulator. The data modem will then begin receiving the transmitted signal in a conventional fashion.

If the call is answered during the delay period provided by the invention and the transmission is a facsimile handshake signal, the call is automatically transferred to the waiting facsimile machine. If a person answers the telephone during the delay period and the call is a data modem transmission, the person must enter certain DTMF digits by pressing the appropriate digits on the touch-tone keypad of the telephone. The call will then be transferred to the data modem.

BRIEF DESCRIPTION OF THE DRAWINGS

The foregoing and other features of the present invention will be more readily apparent from the following detailed description of preferred embodiments taken in conjunction with the attached drawings wherein.

DETAILED DESCRIPTION OF PREFERRED EMBODIMENTS

Figure 1:
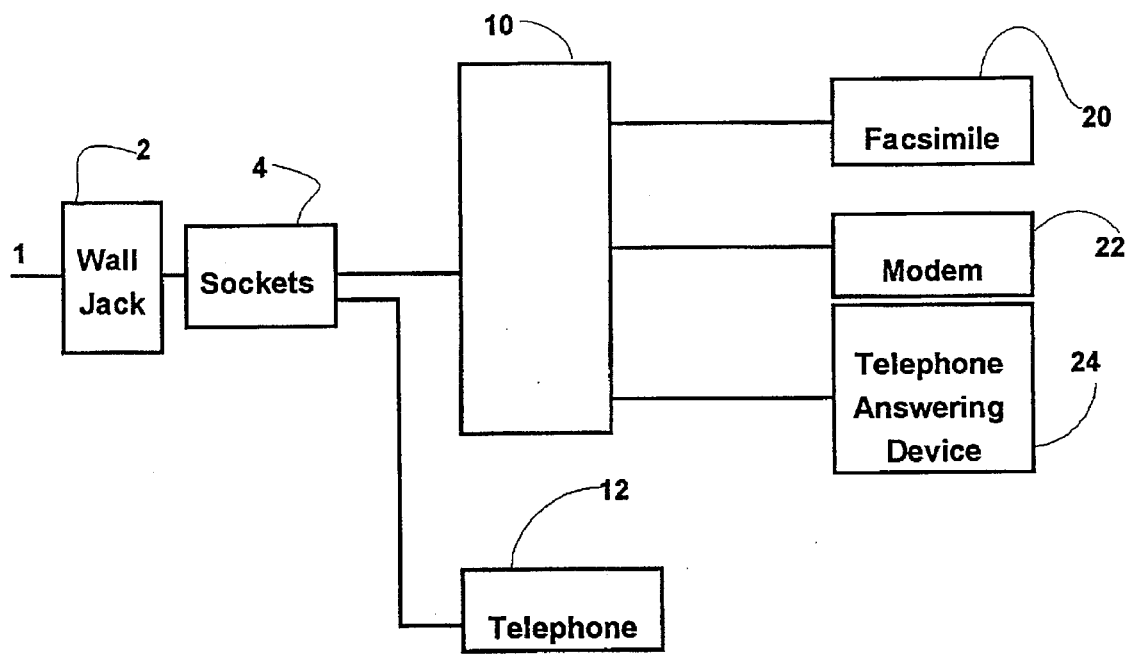
FIG. 1 is a block diagram illustration of a preferred arrangement of an apparatus embodying the present invention to provide a telephone/facsimile machine/data modem shared-line system.

FIG. 1 shows a typical shared-line telephone/facsimile system utilizing the method of the present invention. A standard telephone line 1 from a telephone line network enters the wall of a dwelling and terminates at a standard telephone line wall jack 2. In such application where a telephone, a facsimile machine, and a data modem share a common telephone line, wall jack 2 will generally have multiple female socket connections 4 of the "USOC" variety which are connected to the single telephone line 1. A telephone 12 is connected to one of the sockets 4. A line sharing device in accordance with the present invention, represented by numeral 10 in FIG. 1 preferably provides connectivity for a facsimile machine 20, data modem 22, and conventional telephone answering device 24, to the telephone line 11.

In operation, with the device 10 installed as illustrated in FIG. 1, a person may answer a call via telephone 12. If the call is not answered, the device 10 will either ring the facsimile machine 20, ring the data modem 22, or allow a user to set certain variables, which will be described later.

Figure 2:
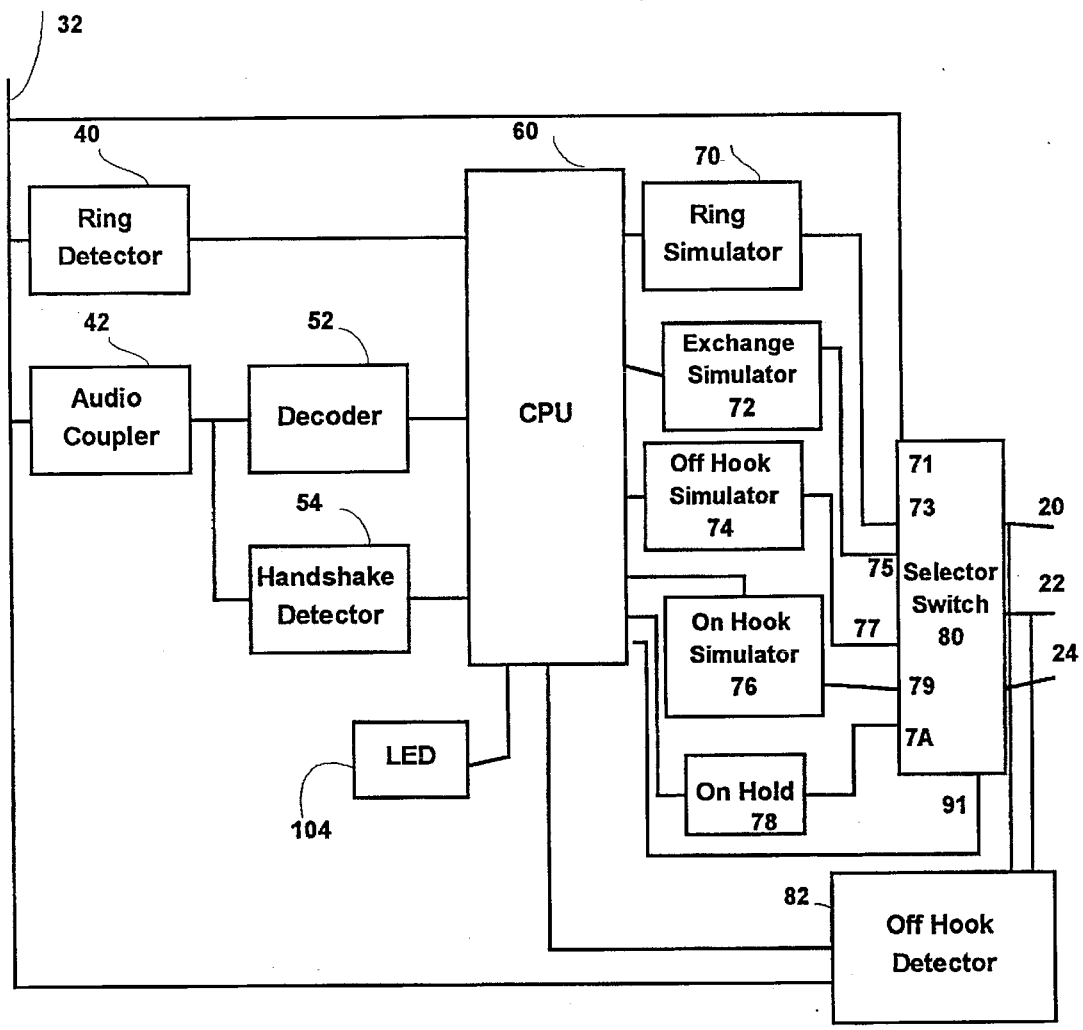
FIG. 2 is a block diagram of a preferred embodiment of a system utilizing the method of the present invention.

FIG. 2 is a preferred embodiment of a device employing the present invention. A standard telephone line 30 is internally connected, in parallel, to four main components including a ring detector 40, an audio coupler 42, an off-hook detector 82, and a selector switch 80. The ring detector 40 can be a conventional detection circuit for detecting standard telephone "ring" signals on a line. This circuit is generally available in I.C. chip form, in particular, a standard 4N32 integrated circuit isolator device can be used. The ring detector 40 detects high voltage A.C. across the incoming telephone line 30, indicating an incoming call, and it outputs a signal indicating the detection of rings to a CPU 60. The ring detector may also be of the type that can distinguish "distinctive" rings in a conventional way, outputting a predetermined different signal associated with each different ring to CPU 60.

The audio coupler 42 can be a standard off-the-shelf audio coupler (also as an I.C. chip) and is used to couple the signals of the incoming line to both a commonly known "handshake" detector circuit 54 and a standard decoder circuit 52. The handshake detector circuit 54 in this preferred embodiment includes a tone decoder. Other equivalent decoders and decoder circuits could be implemented in a manner well known in the art. The tone decoder is set to detect a frequency of 1100 Hz. The bulk of today's fax machines send their CNG handshake signals at this frequency. The outputs of both the decoder circuit 52 and the handshake detector circuit 54 are used as inputs to CPU 60.

The handshake detector circuit 54 detects any handshake signals on telephone line 30 after the call is answered either by a person, an answering machine, or off-hook simulator 74 (described later). The handshake detector circuit 54 outputs a predetermined signal to CPU 60 via line 55 when a handshake signal is detected. Upon notification by circuit 54 of a handshake signal, CPU 60 "rings" (described later) the facsimile machine on line 81 and, when the facsimile machine 20 answers, connects it to telephone line 30 through selector switch 80.

The known off-hook detector circuit 82 detects off-hook conditions existing on both the input telephone line 30 and at the facsimile machine (via line 81). When an off-hook condition is detected at the telephone line 30 or line 81, the off-hook detector circuit 82 sends a predetermined signal via line 61 to the CPU 60.

CPU 60 controls seven main components, a ring simulator 70, an exchange simulator 72, an off-hook simulator 74, an on-hook simulator 76, an "on hold" device 78, an LED 104, and a selector switch 80. Ring simulator 70 can include a suitable conventional oscillator circuit. The oscillator circuit provides a two second "ring" signal at a predetermined frequency, which is 20 Hz in this preferred embodiment. The frequency of 20 Hz is chosen because all fax machines, new or old, respond to input "ring" signals at 20 Hz, whereas only certain older fax machines recognize a 60 Hz "ring" signal.

Ring simulator 70 preferably includes a step up transformer. The output of the oscillator, simulates a standard telephone "ring" signal, similar in frequency and on/off "ring" cycle except that the peak-to-peak voltage is low and needs to be stepped-up before it is sent to an isolated facsimile machine or data modem. Thus, the output of the oscillator is sent first to a step-up transformer. In the preferred embodiment, the transformer must be specifically designed to receive and step-up input signals of 20 Hz to the proper voltage of telephone "ring" signals. The output of the ring simulator 70 is connected to the selector switch 80, described later, and is used by the CPU 60 to "ring" either the facsimile machine or the data modem. The facsimile machine or the data modem reads the incoming simulated "ring" signals and answers the incoming call as if it were first being received from the telephone network.

The exchange simulator 72 is used by the CPU 60 to selectively isolate the connected facsimile machine and data modem from the telephone line 30 and while isolated, to provide the facsimile machine and the data modem with a simulated input so that an incoming call may be answered by another device such as a telephone receiver or an answering machine, without signalling or otherwise activating the facsimile machine or data modem. The exchange simulator 72 therefore allows the facsimile machine at line 81 and data modem at line 83 to sense that there is no incoming call, facsimile, voice or data.

A conventional off-hook simulator 74 is used by CPU 60 to "answer" an incoming call. If a person or answering machine has not answered an incoming call during the delay period, the CPU 60 "answers" the call via simulator 74. When the call is "answered", as the remote station or person transmits its signal, the audio coupler 42 senses the signal transmitted so that DTMF tones may be detected by decoder 52, or handshake signals may be detected by handshake detector 54.

The CPU 60 also controls an "on hold" device 78. The "on hold" device 78 is used by CPU 60 to put a call on hold in a known manner, that is, holding the line in an answered state. Additionally, CPU 60 also turns on or off the LED 104 to signal a user.

Finally, the CPU 60 controls a known type of selector switch 80. The selector switch 80 connects one or more inputs (reference numbers 71, 73, 75, and 77, 79 an 7A,) to one or more outputs (81, 83, 85) in response to a control signal transmitted by CPU 60 via control line 91.

Figure 3:
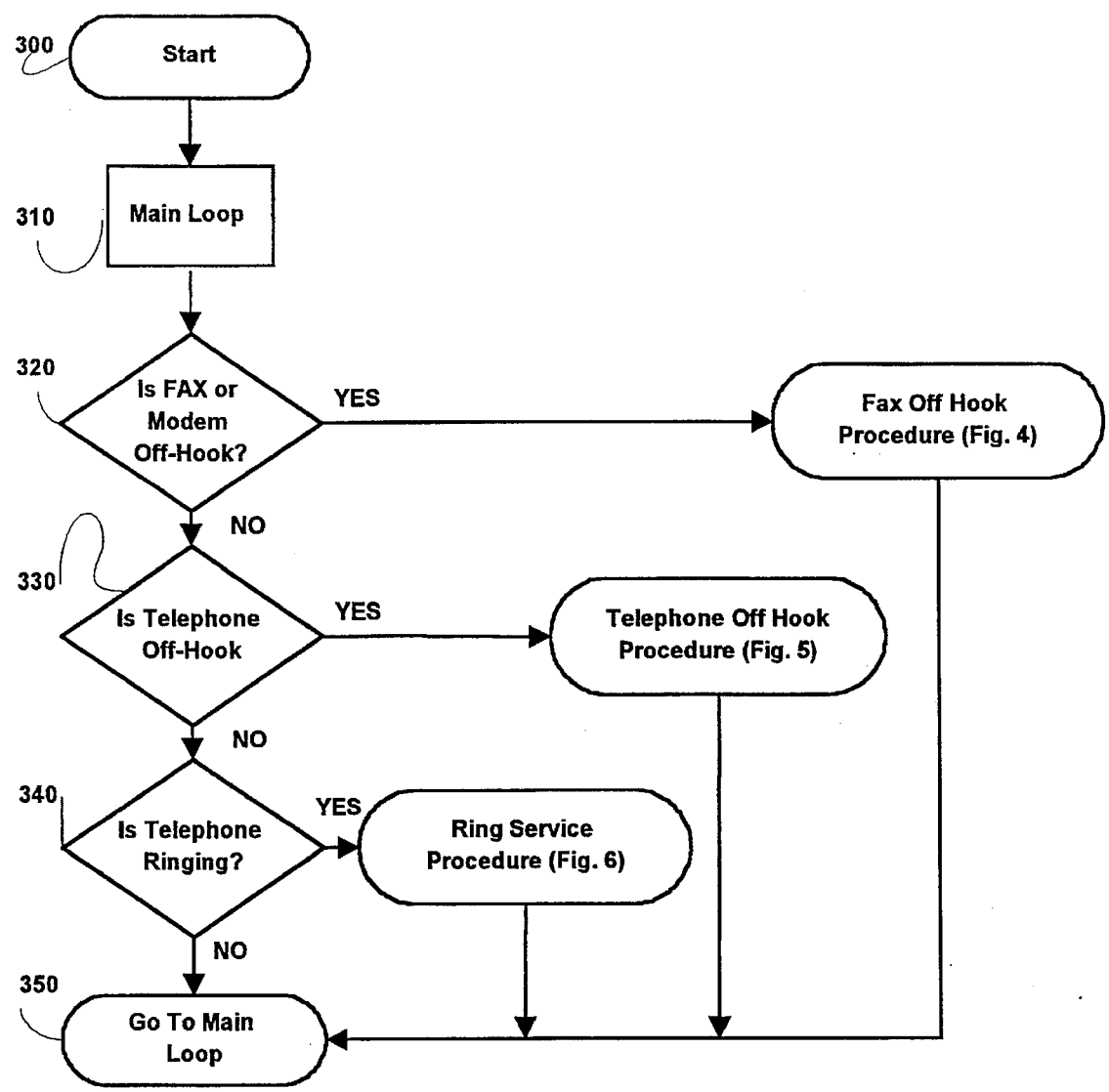
FIGS. 3–9 are flowcharts illustrating the preferred method of the present invention.
Figures 4, 5:
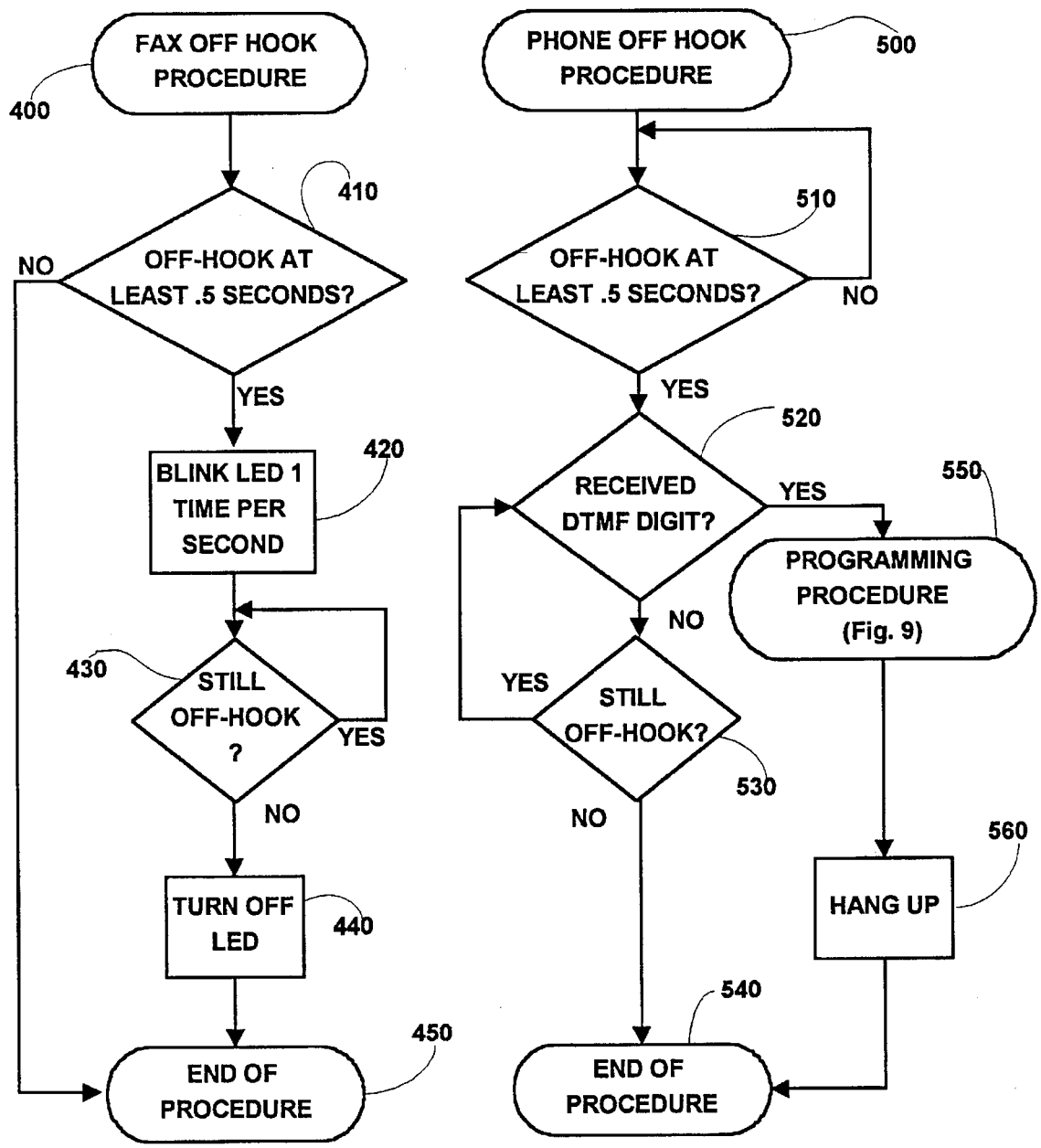

The operation of the above described system can be described with reference to the flowcharts in FIGS. 3–8, in conjunction with FIG. 2. Referring first to FIG. 3 (steps 300 and 310), CPU 60 first determines via off-hook detector 82 if the facsimile machine 20 or modem device is off-hook (step 320). If not the CPU 60 determines if the telephone 12 is off-hook (step 330). If the telephone 12 is not off-hook, the CPU 60 determines if a ring signal is being received by ring detector 40 (step 340). If a ring signal is not being received (step 350), the steps 320–340 are repeated.

If the facsimile machine 20 or modem 22 were found to be off-hook in step 320, the CPU 60 would perform a facsimile off-hook procedure. Referring now to the off-hook procedure illustrated in FIG. 4 (step 400), if the CPU 60 determines that the facsimile machine 20 or modem 22 was off-hook for at least 0.5 seconds, the CPU 60 blinks the LED 104 once per second until the facsimile machine 20 or modem 22 is no longer off-hook (steps 410–440), at which time the off-hook procedure ends (step 450).

If the telephone 12 was off-hook in step 330, CPU 60 performs a telephone off-hook procedure (step 500). If the telephone 12 was off-hook for at least 0.5 seconds (step 510), the CPU 60 determines via decoder 52 if a DTMF digit was received (step 520). If a DTMF digit was not received, control returns to step 520 repetitively until there is no longer an off-hook signal, (step 530) at which time the telephone off-hook procedure ends (step 540). If a DTMF digit was received, the CPU 60 performs a programming procedure step 550, (FIG 9), to be described later, and then "hangs up" the telephone via on-hook simulator 76 (step 560) at which time the programming procedure is terminated (step 540).

Figure 6:
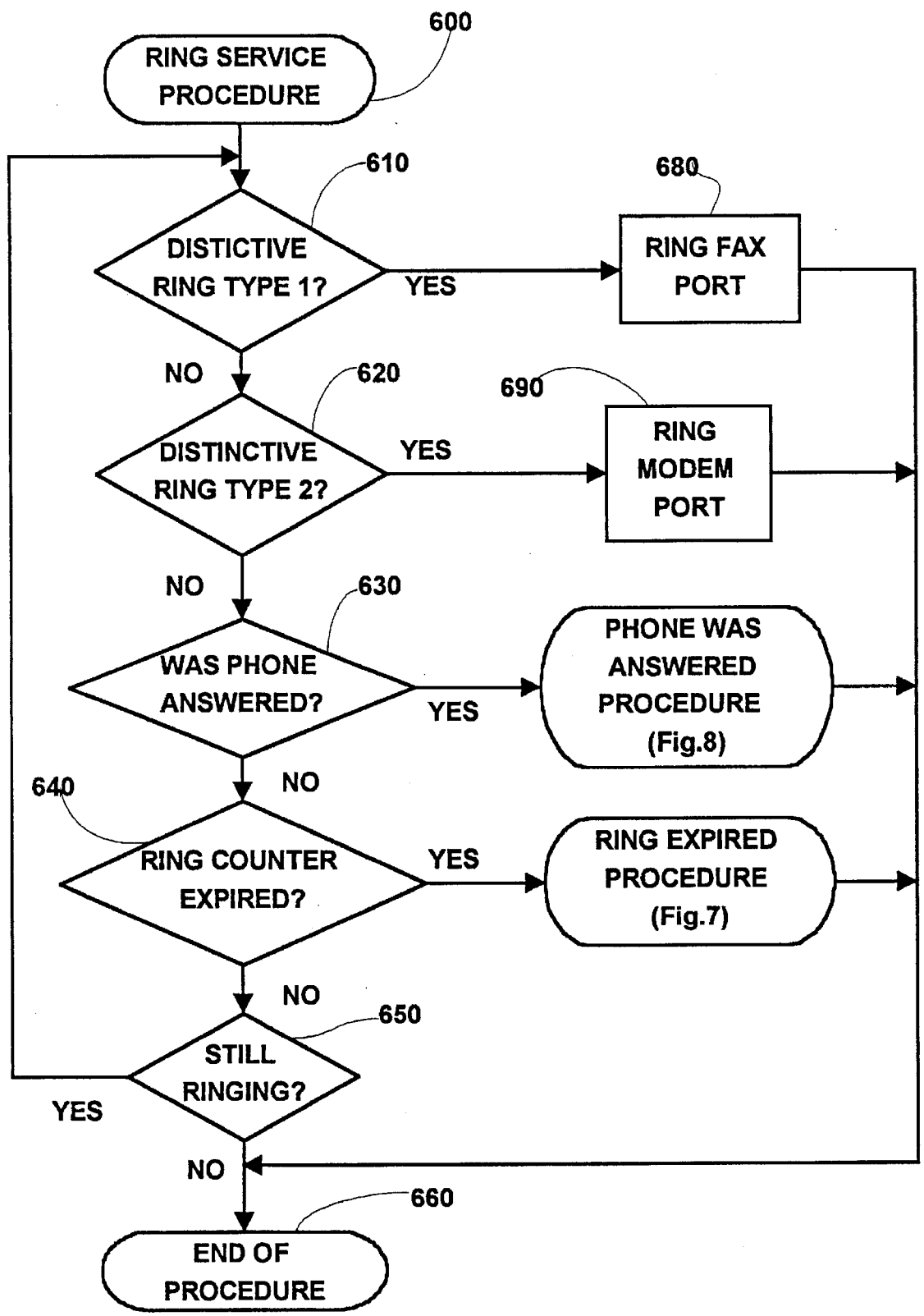

If ring detector circuit 40 detects a "ringing" signal on line 30 during step 340, ring detector 40 signals CPU 60 accordingly, and CPU 60 performs a "ring service procedure" (step 600 FIG. 6). Referring now to FIG. 6, if the ring detector 40 detects a predetermined distinctive incoming call signal on line 30 (step 610), in this case a ring type designated as ring type 1, CPU 60 routes the "ring" signal to the facsimile machine 20 through selector switch 80 (step 680). The facsimile machine 20 then answers the call in the usual manner.

If the ring detector 40 instead, detects a second predetermined distinctive incoming call on line 30 (step 620), the "ring" signal is instead routed to data modem 22 through selector switch 80 (step 690), and the call is be "transferred" in the same manner as described above in connection with the facsimile machine.

If no distinctive rings were detected by ring detector 40, the CPU 60 determines if the phone was answered via off hook detector 82 (630). If an off-hook condition is detected, CPU 60 performs a "TAD was answered" procedure (step 800), described later in connection with FIG. 8.

If the phone was not answered, CPU 60 determines whether a count of the rings has expired (step 640). The count of the rings expires after CPU 60 has detected a predetermined number of rings on line 30 via ring detector 40. If the ring counter has expired, CPU 60 performs a "ring expired" procedure, described later.

Finally, if the phone is still ringing (step 650), steps 610–650 of the ring service procedure are repeated. If the phone has stopped ringing (step 650), the "ring service procedure" ends (step 660).

The "ring service" procedure of FIG. 6 provides the initial routing of the signal from line 30 before the call is answered.

Figure 7:
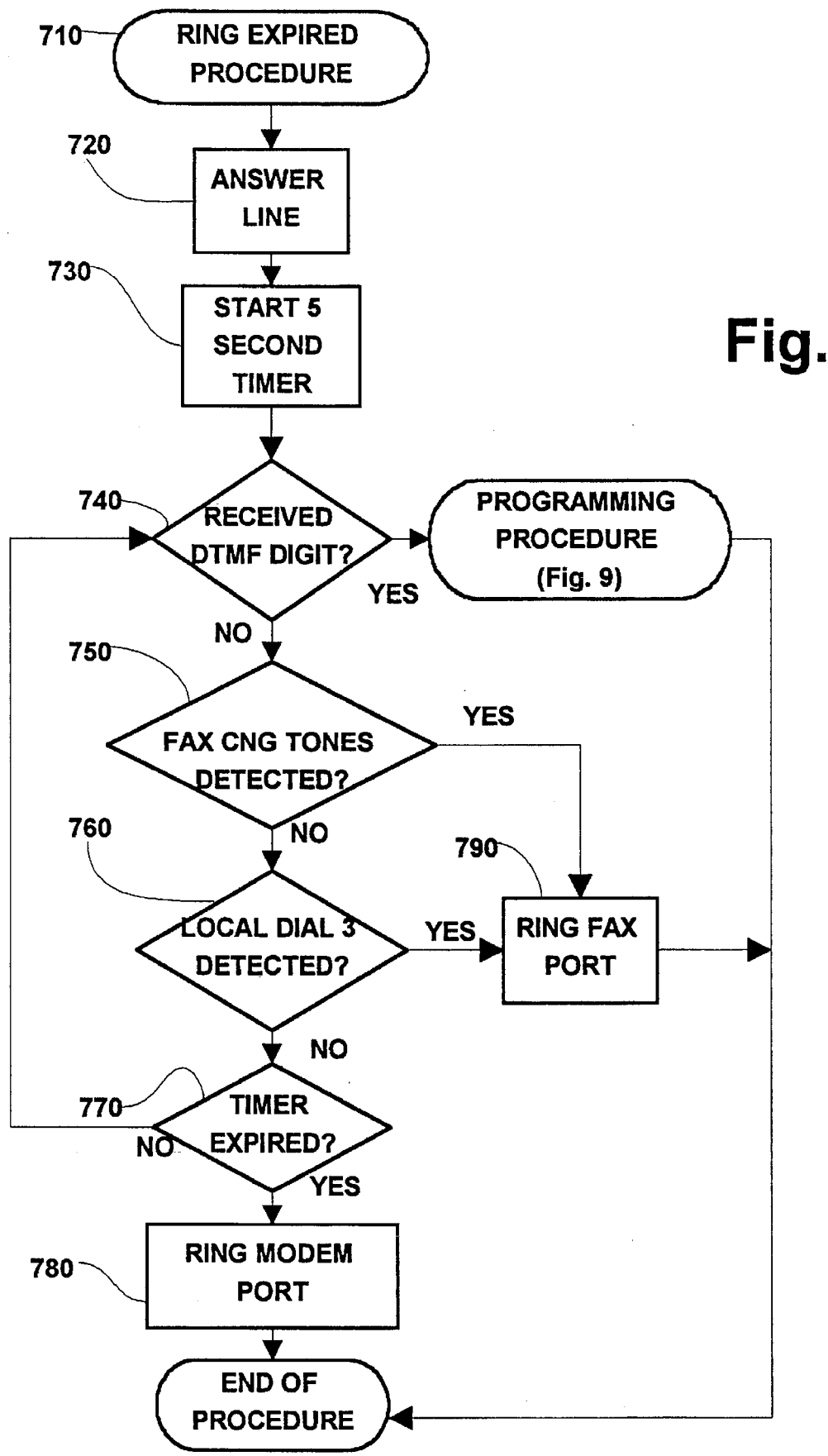

The "ring expired" procedure (step 710), FIG. 7, will now be described. If the ring counter in step 640 of the ring service procedure (FIG. 6) expired, CPU 60 "answers" the call via off-hook simulator 74 (step 720) and starts a 5 second timer (step 730).

It is to be appreciated that reference herein to a "5 second timer" is only for illustrative purposes as CPU 60 may utilize any time period which is desired for an intended application of line sharing device 10.

Figure 9:
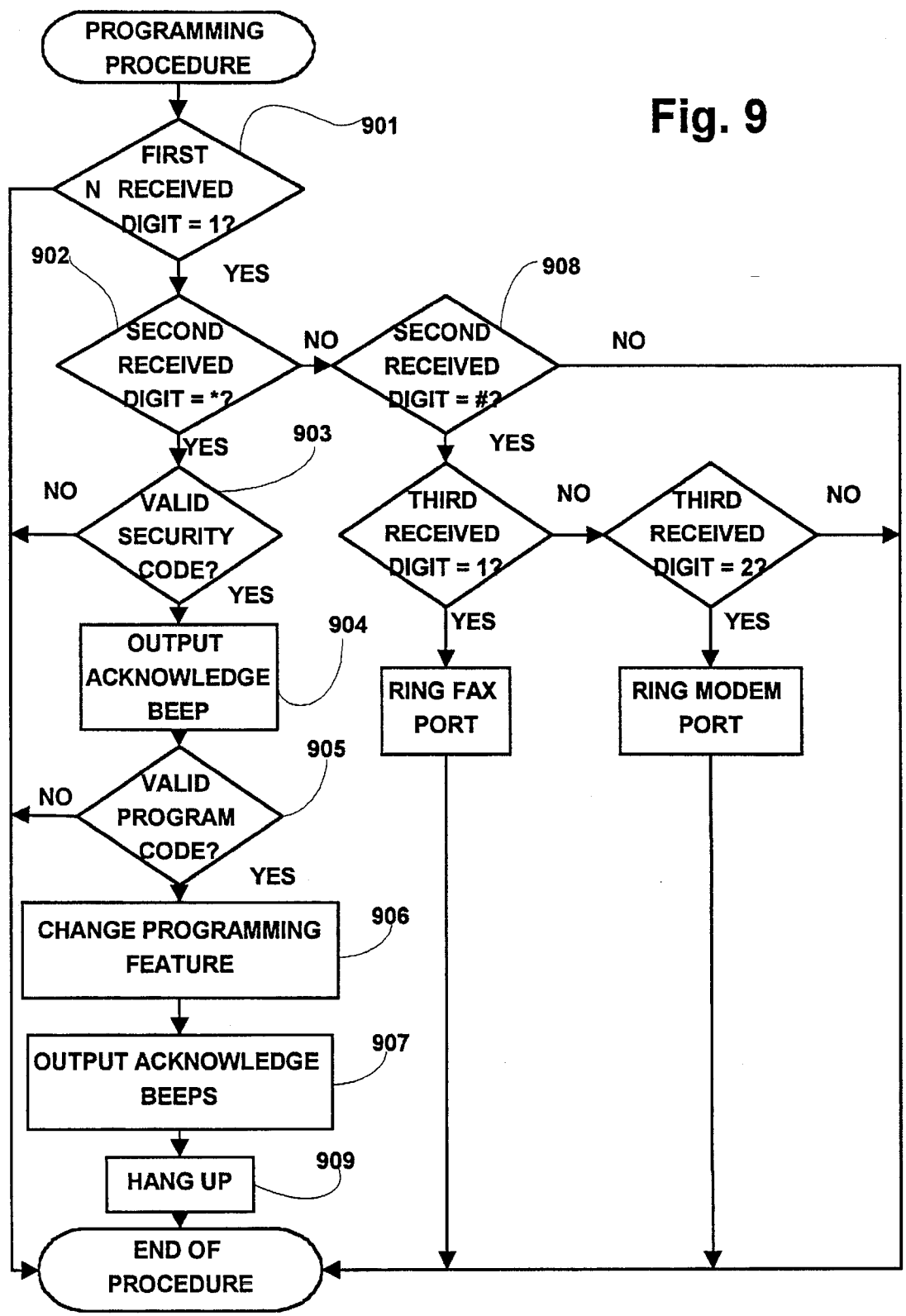

If a DTMF digit is detected via audio coupler 42 and decoder 52 (step 740), CPU 60 initiates the "programming procedure" (FIG. 9, described later). If instead, handshake detector 54 detects CNG tones (step 750) or a local "3" from telephone handset 12 is detected (step 760), CPU 60 rings the facsimile machine (step 790) 20 via ring simulator 70 through selector switch 80, allowing the facsimile machine 20 to "answer" the call in the usual manner.

If the time has not expired (step 770) as set in step 730, steps 740–770 are repeated. If the timer expired (step 770), CPU 60 rings the data modem 22 (step 780) via ring simulator 70 through selector switch 80 and allows the data modem to "answer" the call in the usual manner.

Figure 8:
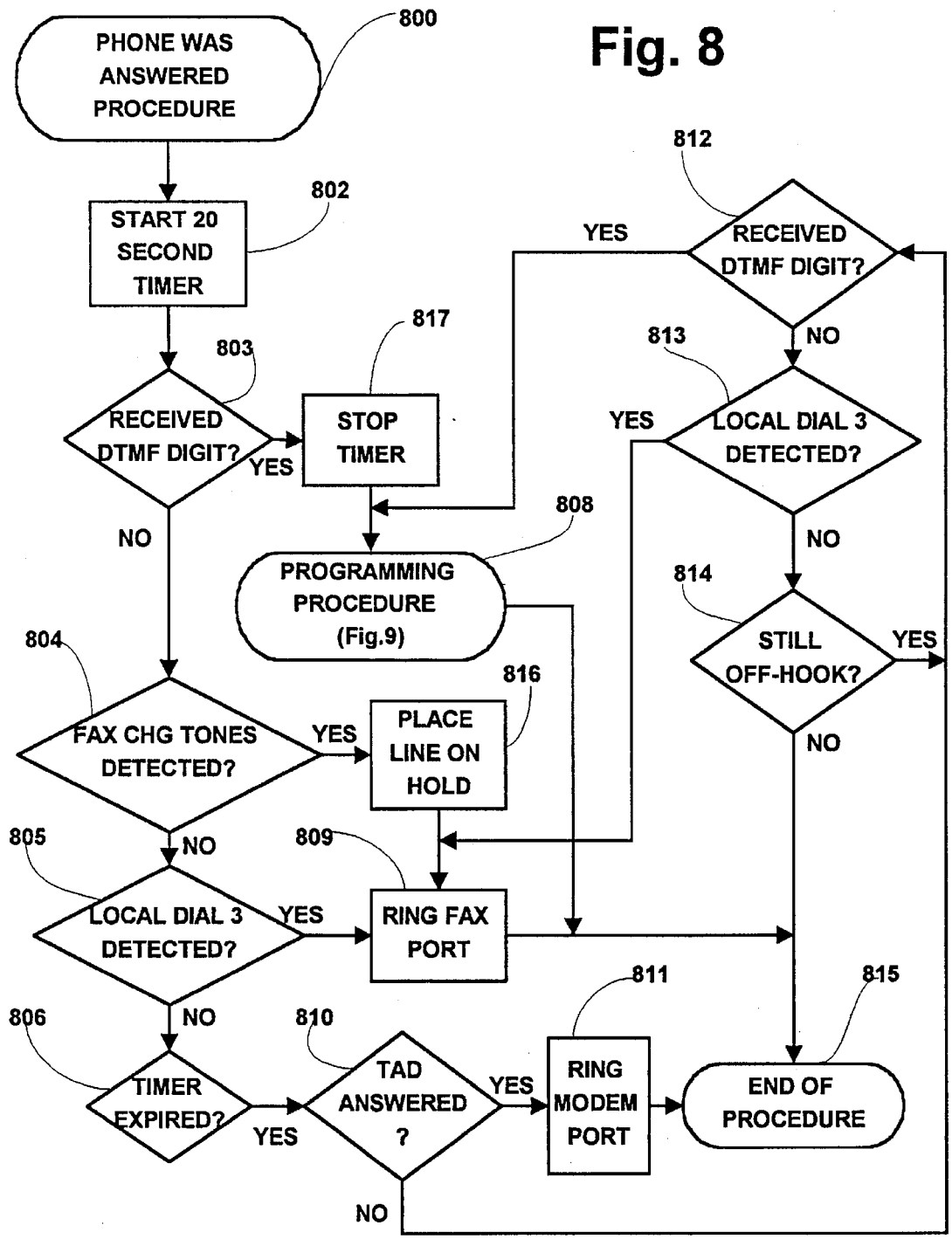

The "TAD was answered" procedure of FIG. 8 will now be described. If the call was answered, CPU 60 starts a 20 second timer (step 802) and then determines whether a DTMF digit was received (step 803) via audio coupler 42 and decoder 52. If a DTMF digit was detected, CPU 60 stops the timer (step 817) and initiates the programming procedure (step 80) (FIG. 9 described later). If facsimile CNG tones were instead detected via handshake detector 54 (step 804) or a local digit "3" was detected (step 805), the line is placed on hold (step 816) with "on hold" device 78 and CPU 60 causes ringing of the facsimile machine 20 (step 809) via ring simulator 70 and selector switch 80, and the facsimile machine is permitted to answer the call in the usual manner, afterwhich the "TAD was answered" procedure is terminated (STEP 815).

If the timer has not expired (originally set in step 802), steps 803–806 are repeated (step 806). If the timer expired (step 806) CPU 60 rings the data modem 22 (step 811) via ring simulator 70 and selector switch 80, connecting line 83 to the call on line 30 and disconnecting the telephone answering device on line 85. If a DTMF digit was received, CPU 60 initiates the programming procedure (step 808).

It should be noted that if the TAD answers the call, a pre-recorded message plays, telling the caller that if they wish to leave a message, they must press a DTMF digit. Thus, in step 803 of the procedure of FIG. 8, the CPU 60 senses the DTMF digit and stops the timer (step 817). CPU 60 then proceeds to the programming procedure (step 808) to insure that the caller was not intending to access the programming feature. Assuming the caller did not wish to access the programming feature, the procedure 800 ends with the TAD simply retaining control of the phone line that it initially answered, allowing a caller to leave a message. The TAD then hangs up in a conventional manner.

The "phone was answered" procedure, as described above, takes care of the transfer of all calls, if necessary, if the call was answered either by a telephone answering device 24 or a telephone handset.

Finally, the "programming" procedure (step 900) of FIG. 9 will be described. If CPU 60 does not detect a DTMF "1" digit as the first detected digit (step 901), the programming procedure ends. If a DTMF "1" is detected and the second detected digit (step 902) is DTMF "*", CPU 60 determines whether a valid security code has been received (step 903). The valid security code is comprised of DTMF digits previously stored in the memory (not shown) of CPU 60. If a valid code is entered, CPU 60 outputs a "beep" signal in a known manner along phone line 30 (step 904). Next, CPU 60 checks for a valid program code (step 905). Program codes are sets of DTMF digits having special meaning to CPU 60. Each code is equated to a particular function that CPU controls such as changing certain internal variables such as the number of rings CPU 60 should wait before it "answers" the phone via the "ring expired" procedure 710. If CPU 60 receives a valid program code (step 905) it performs the predetermined function (step 906), outputs "beep" signals (step 907), and then "hangs up" the telephone line (step 909).

If the second digit received was a DTMF "#" digit (step 908) and the third digit was a DTMF "1," CPU 60 rings the facsimile machine 20, allowing it to answer the call in the usual manner. If the third digit were a "2", the data modem 22 is instead rung.

While the present invention has been particularly shown and described with reference to preferred embodiments thereof, it will be understood by those skilled in the art that various changes in form and details may be made therein without departing from the spirit and scope of the invention as defined in the accompanying claims.

What is claimed is:

1. A method for directing an incoming call from a single input telephone line to either a facsimile machine, a modem or a telephone having a connection to said telephone line, wherein said incoming call includes a "ring" signal followed by either facsimile data or modem data or voice data, depending on the intended destination, the steps of said method comprising:

detecting said "ring" signal of an incoming call;

electrically disconnecting said facsimile machine and said modem from said input telephone line without affecting the connection of the telephone to the telephone line, said step of electrically disconnecting being responsive to detection of said "ring" signal, an incoming call on the telephone line causing said telephone to "ring" and providing an opportunity for a person to answer said incoming call by bringing said telephone to an off-hook state;

answering said incoming call by simulating an off-hook condition if said telephone is not brought to an off hook state within a predetermined delay period;

determining whether said incoming call, upon being answered, includes facsimile data by detecting handshake signals;

electrically reconnecting said facsimile machine to said input telephone line in response to detecting said handshake signals, said facsimile machine reconnecting step including: generating simulated "ring" signals to said facsimile machine, thereby activating said facsimile machine to answer said simulated "ring" signals and to receive said incoming facsimile data;

electrically reconnecting said modem said handshake signals are not detected and said incoming call was answered by simulating said off-hook connection, said modem reconnecting step including generating simulated "ring" signals to said modem, thereby activating said modem to answer said simulated "ring" signals and to receive incoming modem data.

2. The method of claim 1 wherein said answering step includes the steps of:

detecting DTMF digit signals on the telephone line;

decoding said DTMF digit signals on the telephone line producing a program code;

comparing said program code to predetermined codes; and performing said modem reconnecting step if said program code equals at least one of said predetermined codes.

3. An electronic device for controlling the operation of a facsimile machine and a modem which are connected to a single telephone line to which there is also connected a telephone, the facsimile machine and the modem being connected to said telephone line through said device, wherein either a facsimile call or a modem call or a voice call will activate both the electronic device and the telephone, said electronic device comprising:

means for detecting an incoming call;

means for disconnecting said facsimile machine from said telephone line in response to said detection means detecting said incoming call without affecting the connection of said telephone to said telephone line, thereby preventing the facsimile machine from automatically answering said incoming call;

means for disconnecting said modem from said telephone line in response to said detection means detecting said incoming call without affecting the connection of said telephone to said telephone line, thereby preventing the modem from automatically answering said incoming call;

answering means for answering said incoming call upon the expiration of a predetermined period of time;

means for determining whether the incoming call, once answered, is a facsimile call intended for said facsimile machine;

facsimile activating means for activating said disconnected facsimile machine by generating imitation "ring" signals which simulate an incoming call so that said facsimile machine answers said imitation "ring" signals, said facsimile activating means being responsive to said determining means determining said incoming call is a facsimile call;

modem activating means for activating said disconnected modem by generating imitation "ring" signals which simulate an incoming call so that said modem answers said imitation "ring" signals, said modem activating means being responsive to said determining means determining said incoming call is not a facsimile call and said answering means answering the incoming call.

4. The electronic device of claim 3 wherein the answering means includes:

DTMF detection means for detecting DTMF digit signals;

comparing means for comparing said DTMF digit signals to predetermined codes; and means for connecting said modem to said telephone line if said DTMF digit signals equal at least one of said predetermined codes.

* * * * *